INVENTOR.
BERNARD L. SCHULMAN,

United States Patent Office 3,488,280
Patented Jan. 6, 1970

3,488,280
CATALYTIC HYDROGENATION OF COAL
WITH WATER RECYCLE
Bernard L. Schulman, Livingston, N.J., assignor to Esso
Research and Engineering Company
Filed May 29, 1967, Ser. No. 641,937
Int. Cl. C10g 1/08
U.S. Cl. 208—10                                    14 Claims

ABSTRACT OF THE DISCLOSURE

The hydrogenation of coal is enhanced in both reaction conversion and selectivity by maintaining in the reaction zone from 0.05 to 0.30 pound of water per pound of coal. The water may preferably be maintained in the reaction zone by feeding raw coal, with its attached moisture, and supplementing this water by passing the steam from the spent catalyst and char-ash strippers back into the reaction zone.

BACKGROUND OF THE INVENTION

Field of the invention

The present invention relates to the mixed (gas-solid-liquid) phase hydrogenation of coal, by contacting the coal in a solvent with a catalyst and molecular hydrogen, under hydrogenation conditions. By the practice of the present invention, the yield of the valuable $C_5+$ liquid hydrocarbon is enhanced and the yield of gases reduced, so that a greater quantity of liquid products is obtained at a lower hydrogen consumption.

Description of the prior art

The catalytic hydrogenation of coal has been disclosed in many patents, exemplary of which are U.S. Reissue 25,770 (Example 5) and U.S. Patent 3,143,489 (wherein the use of a catalyst and hydrogen is optional). The introduction of water into the reaction zone has, however, not been recommended by the prior art. In U.S. Patent 2,901,423 it is suggested that in the hydrogenation of liquid hydrocarbons in the vapor phase, the addition of water vapor will generate hydrogen in situ, without deleterious effects. This, obviously, is not indicative of the process of the present invention wherein the selectivity of the process is enhanced.

SUMMARY OF THE INVENTION

The present invention comprises the introduction and maintenance of water in a catalytic hydrogenation zone wherein solid coal in a liquid solvent is contacted with a solid catalyst and gaseous hydrogen. Preferably, the water is introduced into the reactor as part of the moisture in the coal but can also be obtained by steam stripping the spent catalyst and the char-ash mixture from the reactor, and recycling the stripping steam, together with hydrocarbon oils removed from the catalyst and char-ash into the reaction zone.

BRIEF DESCRIPTION OF THE DRAWING

The resent invention can best be understood by advertence to the drawings, wherein.

Figure 1:
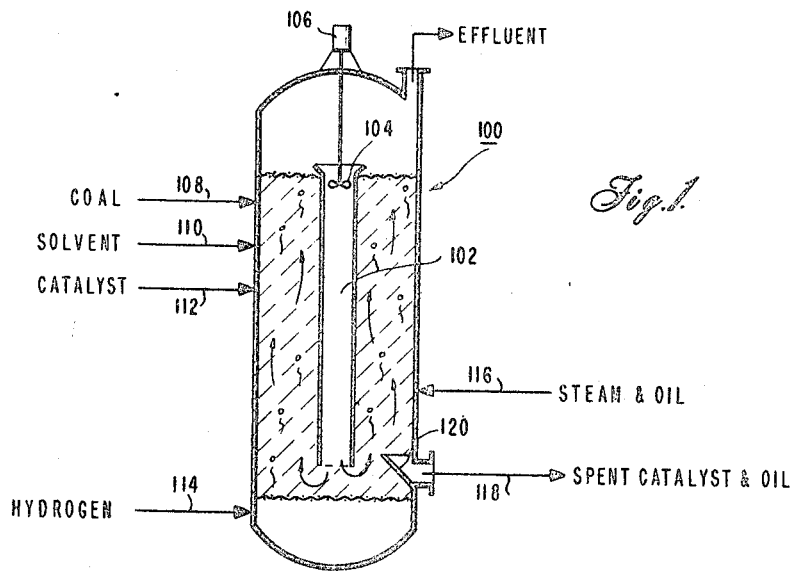
FIG. 1 is a diagrammatic sketch of a hydrogenation reactor wherein coal is contacted with a liquid solvent, solid catalyst, and gaseous hydrogen.

Referring first to FIG. 1, the reactor 100 is seen to include an internal draft tube 102 through which the liquid can be recycled internally. The reactor recycle is accomplished by means of an impeller 104 driven by an electric motor 106. Into the reaction zone 100 are introduced the coal by way of line 108, solvent by way of line 110, and catalyst by way of line 112. The coal is preferably added in a paste (e.g., 50% solids) of coal and solvent. The catalyst may be added along with the coal or solvent. A hydrogen-rich recycle gas (e.g., 70% or more $H_2$) is introduced into the reaction zone by way of line 114 and water, preferably in the form of steam, is introduced by way of line 116. Catalyst is withdrawn by way of line 118 through a drawoff tray 120.

Within the reactor 100, the catalyst and coal may be maintained in the form of a liquid-fluidized bed, with the liquid product being withdrawn by any of line 122. The reaction is carried out as a "mixed phase"; that is, it will contain solid, liquid, and gaseous phase reactants and catalysts.

Figure 2:
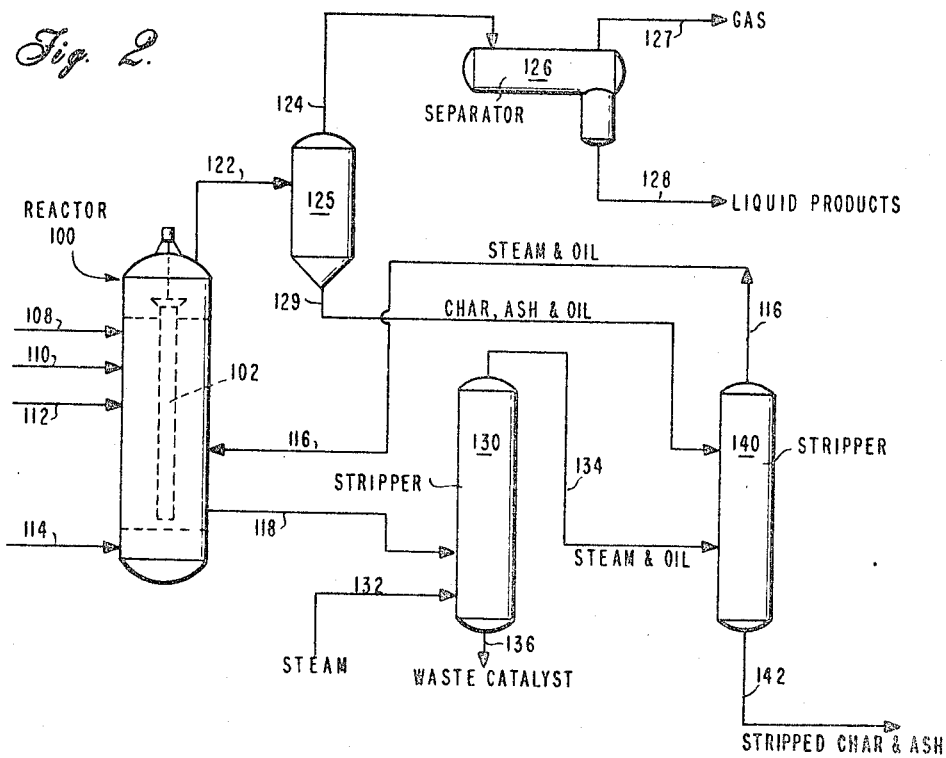
FIG. 2 is a schematic diagram of the combined system including the reactor, spent catalyst stripper, and the char and ash stripped.

Referring now to FIG. 2, wherein similar reference numerals are used to refer to the elements shown in FIG. 1, the reactor 100 is seen to be associated with a steam stripper 130 for spent catalyst and a steam stripper 140 for the char and ash. The coal, solvent, catalyst, water and hydrogen are introduced into the reaction zone as above discussed.

The reaction is carried out in the reactor 100, and the liquid products are removed as effluent through line 122 into a hydroclone 125 and thence through line 124 into separator 126. Solids are removed from hydroclone 125 by way of line 129 and conducted to a stripper 140. From the separator 126 a gas product (containing some steam) is withdrawn by way of line 127 and liquid products (containing some dissolved water) are removed by way of line 128. The liquid products in line 128 may be post-treated, for example, by hydrocracking, to produce the desired products.

A liquid stream is intermittently or continuously withdrawn (as shown schematically by way of line 122), and is passed through a thickener 125 (such as a hydroclone) to obtain a char and ash stream (in oil) which is passed into the char and ash stripper 140 wherein it is contacted with steam and oil from the spent catalyst stripper. A steam plus oil recycle stream is obtained which is carried by way of line 116 for reintroduction into the hydrogenation reaction zone.

Spent catalyst and oil are removed by way of the drawoff tray 120 in line 118 and passed into a catalyst stripper 130. Fresh steam (for example, 450 p.s.i.g. steam further compressed as required) is introduced by way of line 132 and contacted with the spent catalyst for the removal of oil therefrom. The steam and oil from steam stripping are passed by way of line 134 into the char and ash stripper 140 to serve as the stripping steam therein. Waste catalyst is removed by way of line 136 for disposal. Stripped char and ash are removed from the char and ash stripper by way of line 142 for disposal.

Thus, it is seen by reference to the schematic diagram in FIG. 2 a system is provided for maintaining water in the reaction zone as desired.

DESCRIPTION OF THE PREFERRED EMBODIMENTS

The present invention may be understood in its specifics particularly by reference to the schematic diagram set forth in FIG. 2 and by reference to the following table, wherein are set forth the minimum, maximum, and preferred operating conditions in the catalytic hydrogenation zone, the catalyst stripper, and the char and ash stripper.

TABLE I.—OPERATING CONDITIONS

| Catalytic Hydrogenation Zone | Min. | Max. | Pref. |
|---|---|---|---|
| $H_2O$/coal, wt. ratio [1] | 0.10 | 0.50 | 0.35 |
| Solvent/coal, wt. ratio [1] | 0.5 | 4 | 1–2 |
| $CS_2$/catalyst rate, lbs./hr./lb.[2] | 0.02 | 0.10 | 0.08 |
| $H_2$/coal rate, M s.c.f./ton [1] | 25 | 75 | 50 |
| Temp., °F | 700 | 850 | 800 |
| Pressure, p.s.i.g | 1,000 | 3,500 | 2,000 |
| Coal residence time, hrs | 0.25 | 2 | 0.5 |
| Catalyst withdrawal rate, lbs./ton coal | 0.2 | 2 | 1 |
| Catalyst Stripper: | | | |
| $H_2O$/catalyst, wt. ratio | 0.1 | 1 | 0.5 |
| Temp., °F | \} Same as reactor | | |
| Pressure, p.s.i.g | | | |
| Char and Ash Stripper: | | | |
| $H_2O$/char and ash, wt. ratio | 0.1 | 1 | 0.5 |
| Temp., °F | \}Same as reactor | | |
| Pressure, p.s.i.g | | | |

[1] Based on moisture-free coal in the reactor (but includes moisture in raw coal feed).
[2] Based on catalyst added to the reactor.

HYDROGENATION ZONE

The coal is hydrogenated to form liquid products by contact in the catalytic hydrogenation zone with a solid catalyst, a liquid solvent, and molecular hydrogen. Where the catalyst is a sulfided metal, it may be desirable to maintain a flow of carbon disulfide into the reactor to prevent reduction of the catalyst to the metal. Water is fed into the reaction zone to improve both conversion and selectivity.

The coal is preferably crushed before introduction into the reactor, having a maximum particle size less than 0.005 inch (passing through a 100 mesh size Tyler screen).

Suitable coals for use in the process of the present invention are found in the lignites, subbituminous coal and bituminous coal, etc.

Suitable catalysts are cobalt molybdate, $SnS+CH_3I$, $Fe+Fe(SO_4)$, Ni, Fn, etc., in the form of $\frac{1}{32}''$ to $\frac{1}{16}''$ prills. Cobalt molybdate on alumina is preferred.

The solvent which is used in the reaction zone is preferably a hydrogen-donor solvent such as tetralin or partially hydrogenated 3 or 4 ring aromatics (anthracene, etc.). Such a solvent may be obtained by hydrogenation of the hydrocracked liquid products of this reaction. Such a solvent would boil within the range from 450° to 950° F., with the preferred range being 600° to 950° F.

The solvent/coal weight ratio, within the range shown in Table I, is chosen to maintain the coal in a fair dispersion within the reaction zone. The recycle of the solvent and coal mixture, internally or externally, and of hydrogen-containing gas helps to maintain the coal and catalyst in a fine admixture throughout the reaction zone.

The reaction conditions are fairly widely variable, but will be suitable if chosen within the ranges set forth in Table I.

In the catalytic hydrogenation zone, up to about 85 to 95 weight percent of the MAF coal feed will be converted into liquid and gaseous products. Of the converted coal, about 70 to 75% will be liquid and the remainder gaseous. As it is known, the ratio of hydrogen to carbon decreases with increasing molecular weight, so that the highest consumption of hydrogen would be associated with the production of methane gas ($CH_4$, which has an H/C atomic ratio of 4). For comparison, the atomic ratio of hydrogen to carbon in octane, $C_8H_{18}$, is 18/8 (=2.25). In aromatic products, such as benzene, $C_6H_6$, the atomic ratio is 1:1. Thus, it is desirable to obtain as much liquid product as possible, so that the hydrogen consumption can be minimized. The present invention provides such a process.

In Table II are shown three batch runs comparing the hydrogenation of sub-bituminous coal with and without water. The runs were made in a pressure bomb; all reactants were charged into the bomb and then heated to the indicated temperature and pressure. From Table II it is seen that the addition of water increases the yield of liquid product and decreases the hydrogen consumption (i.e., better selectivity). It should also be noted that in most cases the conversion of coal has been enhanced where similar operating conditions were chosen.

TABLE II

| Run No | 1SB-1 | 1SB-2 | 1SB-3 |
|---|---|---|---|
| Operating conditions: | | | |
| Catalyst | Cobalt molybdate | | |
| Conversion, wt. percent | 89 | 86 | 91 |
| Temperature, °F | 826 | 826 | 861 |
| Pressure (cold), p.s.i.g | 800 | 800 | 800 |
| Pressure (hot) | 2,400 | 1,950 | 2,150 |
| Tetralin/coal [1] | 2.6 | 2.6 | 2.6 |
| Coal/catalyst [1] | 1.5 | 1.5 | 1.5 |
| $CS_2$/catalyst | 0.08 | 0.08 | 0.08 |
| Time, hrs | 1.0 | 1.0 | 1.0 |
| $H_2O$/coal [1] | 0.34 | 0.06 | 0.06 |
| $H_2$/coal [1] | 0.07 | 0.07 | 0.07 |
| $H_2$ consumption [2] | 0.042 | 0.046 | 0.056 |
| Yields, wt. percent MAF coal: | | | |
| $CO_2$ | 6 | 4 | 3 |
| $H_2O$ | 14 | 16 | 17 |
| $C_1$–$C_4$ | 3 | 4 | 11 |
| $C_5$+Liquid | 68 | 65 | 63 |
| Char | 11 | 14 | 9 |

[1] Based on moisture-free coal in the reactor, lbs./lb.
[2] Based on MAF coal, lbs./lb.

Referring to Table II and comparing the Runs 1SB-1 and 1SB-2, a sub-bituminous coal was hydrogenated in a pressure bomb under an initial pressure of 800 p.s.i.g. and a final (hot) pressure of about 2400 pounds. Note that at a temperature of 826° F., the conversion "with water" (0.34 $H_2O$/coal) was 89% as compared to 86% in 1SB-2 "without water" (0.06 $H_2O$/coal). Note also that the yield of $C_5$+liquid in 1SB-1 was 68 weight percent whereas 1SB-2 showed only a 65 weight percent yield of $C_5$+liquid. The higher conversion and liquid yield were obtained at a lower consumption of hydrogen, 0.042 for 1SB-1 as compared to 0.046 for 1SB-2.

When the temperature was raised to 861° F. (1SB-3), the coal "without water" showed an increase in conversion to 91%, but this was accomplished by an increase in the yield of lighter materials and a decrease in the yield of $C_5$+liquid (to only 63%). Note that hydrogen consumption was increased to 0.056.

It has been found that lignite hydrogenation also shows an improvement in selectivity and yields when water is added to the reaction zone.

By reference to Table II it is seen that the use of water does tend to increase the reactivity of coal so that higher conversions can be obtained at the same conditions, together with a greater selectivity to the production of heavier liquids and a concomitant reduction in the amount of hydrogen which is consumed.

Having disclosed in detail the substance of the present invention, together with the preferred operating conditions, what is intended to be covered by Letters Patent should be limited only by the appended claims.

I claim:

1. In the catalytic hydrogenation of coal wherein a comminuted coal feedstock in a solvent in the liquid phase is contacted with molecular hydrogen and a hydrogenation catalyst,
the improvement of maintaining water in the reaction zone in amounts from 0.10 to 0.50 pound per pound of moisture-free coal in the reaction zone,
whereby the production of $C_5$+ liquid products is enhanced.

2. A process in accordance with claim 1 wherein the catalyst is sulfided cobalt molybdate on alumina.

3. A process in accordance with claim 1 wherein the reaction conditions include
a solvent/coal weight ratio from 0.5 to 4,
a hydrogen/coal feed rate from 25 to 75 M s.c.f./ton,
a temperature from 700 to 850° F.,
a pressure from 1000 to 3500 p.s.i.g. and
a coal residence time from 0.25 to 2 hours.

4. A process in accordance with claim 3 wherein the catalyst is sufided cobalt molybdate on alumina.

5. A process in accordance with claim 4 further comprising the step of adding $CS_2$ to the reactor at a rate from 0.02 to 0.10 pound of $CS_2$ per pound of catalyst added to the reactor.

6. A process in accordance with claim 1 further comprising the steps of
   withdrawing from 0.2 to 2.0 pounds of catalyst per ton of coal feed,
   contacting said withdrawn catalyst with steam in a catalyst stripping zone under conditions including
      a steam/catalyst weight ratio from 0.1 to 1,
      a temperature from 700 to 850° F., and
      a pressure from 1000 to 3500 p.s.i.g.,
   and passing the vapor effluent from said catalyst stripping zone into said reaction zone as the source of at least a portion of said water.

7. A process in accordance with claim 6 further comprising the intermediate steps of
   withdrawing char and ash from said reaction zone, and contacting said withdrawn char and ash in a char and ash stripping zone with the vaporous effluent from said catalyst stripping zone under conditions including
      a steam/char and ash weight ratio from 0.1 to 1,
      a temperature from 700 to 850° F., and
      a pressure from 1000 to 3500 p.s.i.g.,
   and thereafter passing the vapor effluent from said char and ash stripping zone into said reaction zone as the source of at least a portion of said water.

8. In the catalytic hydrogenation of sub-bituminous coal wherein a comminuted coal feedstock having a maximum particle size less than 0.005 inch is contacted in a solvent in the liquid phase with molecular hydrogen and a hydrogenation catalyst,
   the improvement of maintaining water in the reaction zone in amounts from 0.10 to 0.50 pound per pound of moisture-free coal in the reaction zone,
   under reaction conditions which include
      a solvent/coal weight ratio within the range from 1 to 2,
      a hydrogen/coal feed ratio of about 50 M s.c.f./ton MAF,
      a tempreature of about 800° F.,
      a pressure of about 2000 p.s.i.g., and
      a coal residence time of about 0.5 hr.,
   whereby the production of $C_5+$ liquid products is enhanced.

9. A process in accordance with claim 8 wherein the solvent is a 600 to 950° F. cut of liquid products.

10. A process in accordance with claim 8 wherein the catalyst is sulfided cobalt molybdate on alumina.

11. A process in accordance with claim 10 wherein $CS_2$ is added to the reaction zone at the rate of about 0.08 pound per hour per pound of catalyst in the reactors.

12. A process in accordance with claim 11 wherein the water/coal weight ratio is about 0.35 pound per hour of water per pound of moisture-free coal in the reaction zone.

13. A process in accordance with claim 8 further comprising the steps of
   withdrawing from 0.2 to 2.0 pounds of catalyst per ton of coal feed,
   contacting said withdrawn catalyst with steam in a catalyst stripping zone under conditions including
      a steam/catalyst weight ratio from 0.1 to 1,
      a temperature from 700 to 850° F., and
      a pressure from 1000 to 3500 p.s.i.g.,
   and passing the vapor effluent from said catalyst stripping zone into said reaction zone as the source of at least a portion of said water.

14. A process in accordance with claim 13 further comprising the intermediate steps of
   withdrawing char and ash from said reaction zone, and contacting said withdrawn char and ash in a char and ash stripping zone with the vaporous effluent from said catalyst stripping zone under conditions including
      a steam/char and ash weight ratio from 0.1 to 1,
      a temperature from 700 to 850° F., and
      a pressure from 1000 to 3500 p.s.i.g.,
   and thereafter passing the vapor effluent from said char and ash stripping zone into said reaction zone as the source of at least a portion of said water.

References Cited

UNITED STATES PATENTS

| | | | |
|---|---|---|---|
| 2,901,423 | 8/1959 | Herbert et al. | 208—264 |
| 3,018,242 | 1/1962 | Gorin | 208—8 |
| 2,840,462 | 6/1958 | Gorin | 208—8 |

DELBERT E. GANTZ, Primary Examiner

V. O'KEEFE, Assistant Examiner

U.S. Cl. X.R.

208—8